Figure 1:
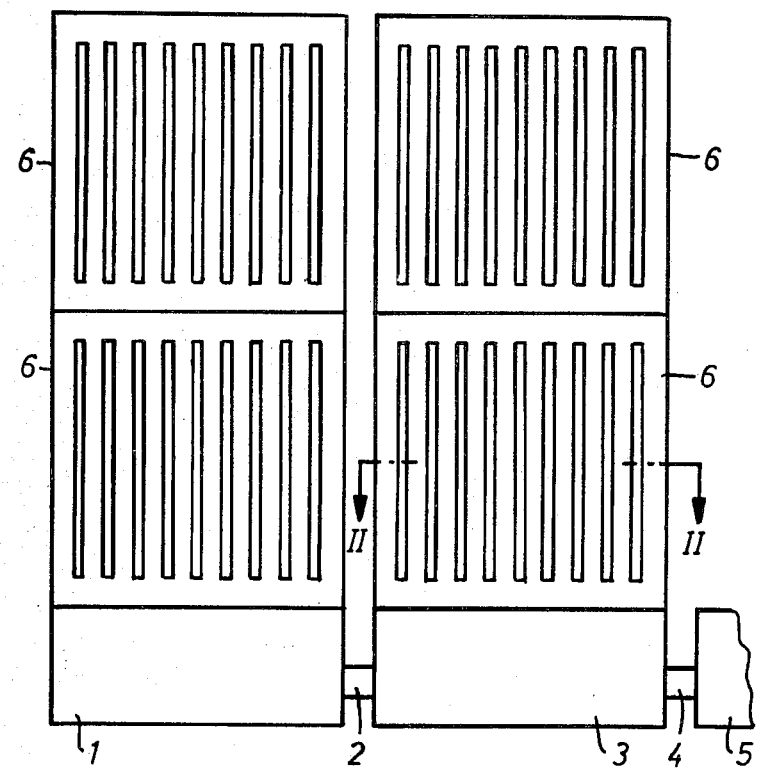

United States Patent [19]

Köster

[11] 4,295,965

[45] Oct. 20, 1981

[54] MULTI-FILTER CHAMBER AQUARIUM FILTER

[76] Inventor: Siegfried Köster, Paulsdorfer Strasse 2, D-8000 München 2, Fed. Rep. of Germany

[21] Appl. No.: 63,115

[22] PCT Filed: Jan. 20, 1979

[86] PCT No.: PCT/DE79/00006

§ 371 Date: Aug. 2, 1979

§ 102(e) Date: Aug. 2, 1979

[30] Foreign Application Priority Data

Jan. 24, 1978 [DE] Fed. Rep. of Germany ....... 2802908

[51] Int. Cl.³ .............................................. E04H 3/20
[52] U.S. Cl. ................................................... 210/169
[58] Field of Search .................. 210/169; 119/3, 5

[56] References Cited

U.S. PATENT DOCUMENTS

| | | | |
|---|---|---|---|
| 3,487,440 | 12/1969 | Newsteder | 210/169 |
| 3,513,978 | 5/1970 | Newsteder | 210/169 |
| 3,669,297 | 6/1972 | Willinger | 210/169 |
| 3,768,651 | 10/1973 | Streeter | 210/169 |
| 3,835,813 | 9/1974 | Katz | 210/169 |
| 3,848,567 | 11/1974 | Garber, Jr. | 210/169 |
| 3,891,555 | 6/1975 | Bennett et al. | 210/169 |
| 3,957,634 | 5/1976 | Orensten | 210/169 |
| 4,067,809 | 1/1978 | Kato | 210/169 |
| 4,133,760 | 1/1979 | Opqua | 210/169 |
| 4,148,730 | 4/1979 | Willizer | 210/169 |
| 4,206,719 | 6/1980 | Faris | 210/169 |

FOREIGN PATENT DOCUMENTS

| | | | |
|---|---|---|---|
| 1846045 | 11/1961 | Fed. Rep. of Germany | 210/169 |
| 1607151 | 8/1970 | Fed. Rep. of Germany | 210/169 |
| 1911857 | 9/1970 | Fed. Rep. of Germany | 210/169 |
| 7022448 | 6/1970 | Fed. Rep. of Germany | 210/169 |
| 1911092 | 7/1970 | Fed. Rep. of Germany | 210/169 |
| 1611041 | 8/1970 | Fed. Rep. of Germany | 210/169 |
| 2301430 | 7/1974 | Fed. Rep. of Germany | 210/169 |
| 2255014 | 7/1975 | France | 210/169 |
| 1208994 | 10/1970 | United Kingdom | 210/169 |

*Primary Examiner*—Theodore A. Granger
*Attorney, Agent, or Firm*—Frishauf, Holtz, Goodman & Woodward

[57] ABSTRACT

An underwater filter for aquaria has a base portion (1) on which several similarly constructed filter cassettes (6) are located above each other. The filter cassettes (6) are made to be essentially rectangular of block-like shape and have two filter chambers (68, 69) as well as a clear-water (66). The clear-water chamber (66) is positioned between the two filter chambers (68 and 69) and is in flow communication with the base portion (1), the covers (61, 62) formed with apertures (610, 620) therethrough of the essentially rectangular block-like cassette (6) are removable, whereby access to the filter materials in the filter chambers (68 and 69) is possible. In operation, the aquarium water to be filtered is sucked by means of a pump connected to the base portion through the slits (610, 620) in the filter chambers (68 and 69) and from there into the clear-water chamber (66) and connecting thereto into the base portion (1) and then returned to the aquarium. To increase the filter capacity, several filter cassettes can be located on a base portion or several base portions with filter cassettes arranged thereon can be interconnected in flow communication.

10 Claims, 5 Drawing Figures

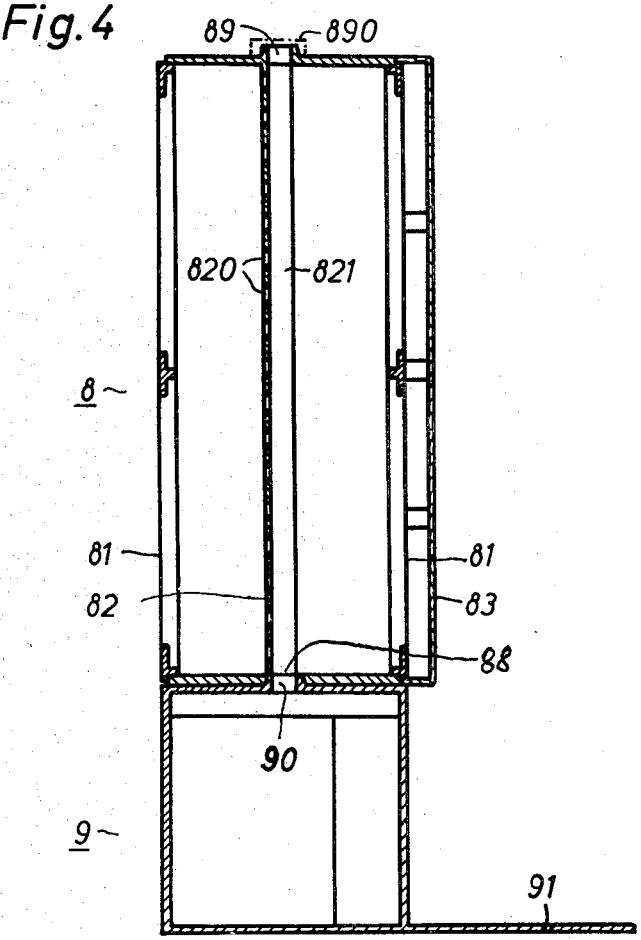
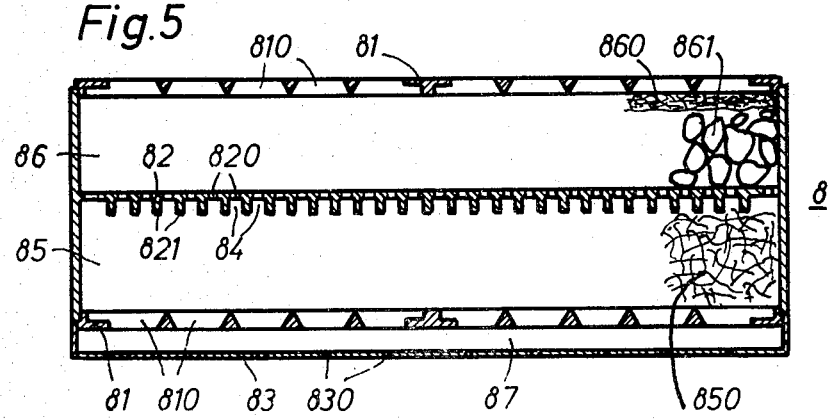

MULTI-FILTER CHAMBER AQUARIUM FILTER

The invention relates to an aquarium filter with a filter body to retain contamination of the aquarium water and a suction device, in which the filter body has two filter chambers to receive filter materials and a clear-water chamber in communication with the suction device.

BACKGROUND

Aquarium filters of this type are known see for example German Disclosure Document DE-OS 2 301 430. The filter bodies of this known aquarium filter consist of three perforated filter tubes which are positioned with spacing from each other, in which the ring spaces located between the filter tubes form the two filter chambers to receive filter materials. The clear-water chamber is positioned between the inner filter tube and the supply tube which is carried through the inner filter tube for a mammoth pump arranged below the filter body. The aquarium water sucked over the airlift pump and the clear-water chamber thus flows sequentially through the outer and the inner filter chamber. This known construction as a multi-chamber filter has, primarily, the advantage that different filter materials which have different objects can be received in the two filter chambers. For example, a matting of filter material in the outer filter chamber serves to mechanically clean the aquarium water, whereas filter materials such as activated coal, gravel, peat fibers, lava chips, and the like, in the inner filter chamber should serve for chemical treatment or regeneration, respectively, of the aquarium water.

In the known construction, due to the different cross section of the two concentric filter chambers, a strongly increasing flow speed, in radial direction, of the aquarium water will necessarily result. This means on the other hand that the filter material of the inner filter chamber, due to the higher flow speed, will form deposits thereon comparatively quickly and must be frequently cleaned. The cleaning which is necessary with decreasing filtration effect causes some difficulties due to the complicated and interfitting construction of the filter body.

THE INVENTION

It is an object of the present invention to provide an aquarium filter which is formed as a multiple-chamber filter which is easy to service and has high throughput.

In accordance with the invention, this object is solved in that in an aquarium filter of the above referred-to form, the filter body consists of at least one essentially rectangular block-like cassette which has separable covers located at two opposite side walls and formed with passages therethrough, and that in the cassette, the clear-water chamber is located between the filter chambers which are positioned at the outside thereof. The rectangular box-like shape of the cassette of the aquarium filter in accordance with the invention results in self-adjustment of uniform flow speeds of the aquarium water in both filter chambers, which increases the receptivity for contaminating substances so that cleaning need be carried out less frequently. Since the two outside position filter chambers are easily accessible by separation of the covers, the cleaning to be done from time to time is particularly simple. Further advantages are obtained by the essentially rectangular block-like shape of the cassette matched to the geometry of most aquaria and by the complete functional separation of the two filter chambers. As a consequence of this functional separation which is obtained by the outwardly positioned arrangement of the two filter chambers, the filter chambers can carry out different tasks independently from each other. For example, one filter chamber can be formed as a mechanical filter and the other filter chamber as a biological filter. If in such a case the mechanical filter portion becomes clogged due to contamination, filtration is still being ensured by the biological filter portion. In contrast, any filtration of the aquarium water is inhibited in an aquarium filter constructed according to the State of the Art upon clogging of the mechanical filter portion.

In a preferred embodiment of the aquarium filter in accordance with the invention, an intermediate wall is located between the clear-water chamber and one filter chamber fixedly secured with the cassette and formed with openings therethrough. This intermediate wall increases the mechanical stability of the cassette. Preferably, the intermediate wall has drain projections which form the clear-water chamber. Since these drainage projections maintain the filtration material of the adjacent filter chamber at a distance, and ensure the drainage of water, no further second intermediate wall is necessary to form the clear-water chamber.

In a further preferred embodiment of the aquarium filter in accordance with the invention, a third cover formed with apertures is releasably applied, with space, from one of the covers, the cross section of the apertures of the third cover being smaller by several orders of magnitude than the cross section of the openings of the two other covers. This substantially increases the flow of the aquarium water through the third cover, that is, contaminating particles suspended in the aquarium water can be more easily captured and can be sucked in a more extended attachment range. The available cross section increases again behind the cover so that, upon flow through the adjacent filter chamber, a uniform and comparatively low flow speed will set itself.

A further simplification of servicing of the aquarium filter in accordance with the invention is obtained in that the suction device consists of an essentially rectangular block-like base component and a supply portion connected thereto, and that the connection between the base component and the clear-water chamber can be obtained by seating a cassette thereon. Since the base portion remains in the aquarium water upon cleaning of the filter, it can be fitted substantially into the sand which is present at the bottom of an aquarium. Upon availability of a replacement filter cassette, it can be rapidly seated on the base portion instead of the contaminated cassette. To increase the steadiness of the base portion in the aquarium, it may have a projecting base plate. In the base portion which can be filled with a ballast, such as gravel, the additional weight also increases the steadiness thereof.

The aquarium filter in accordance with the invention can be assembled in modular form due to its cassette construction to larger units which can be matched to different throughputs and sizes of aquaria. A possibility therefor consists in that, for parallel connection of the cassettes, the associates basis portions can be joined together. In accordance with a further possibility, the cassettes can be placed in series connection and stacked above each other and connected together in the region of the clear-water chambers.

Preferably, the cassettes consist of a plastic made by injection molding. This permits inexpensive mass production by injection molding of the cassettes. Further, such plastics are resistant against salt water and are inert with respect to aquarium water.

DRAWINGS

Examples of the invention will be explained in more detail. There are shown in

Figure 2:
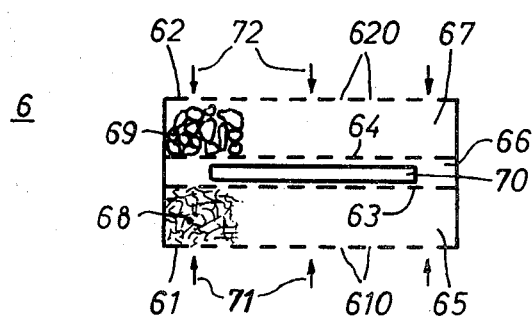
Figure 3:
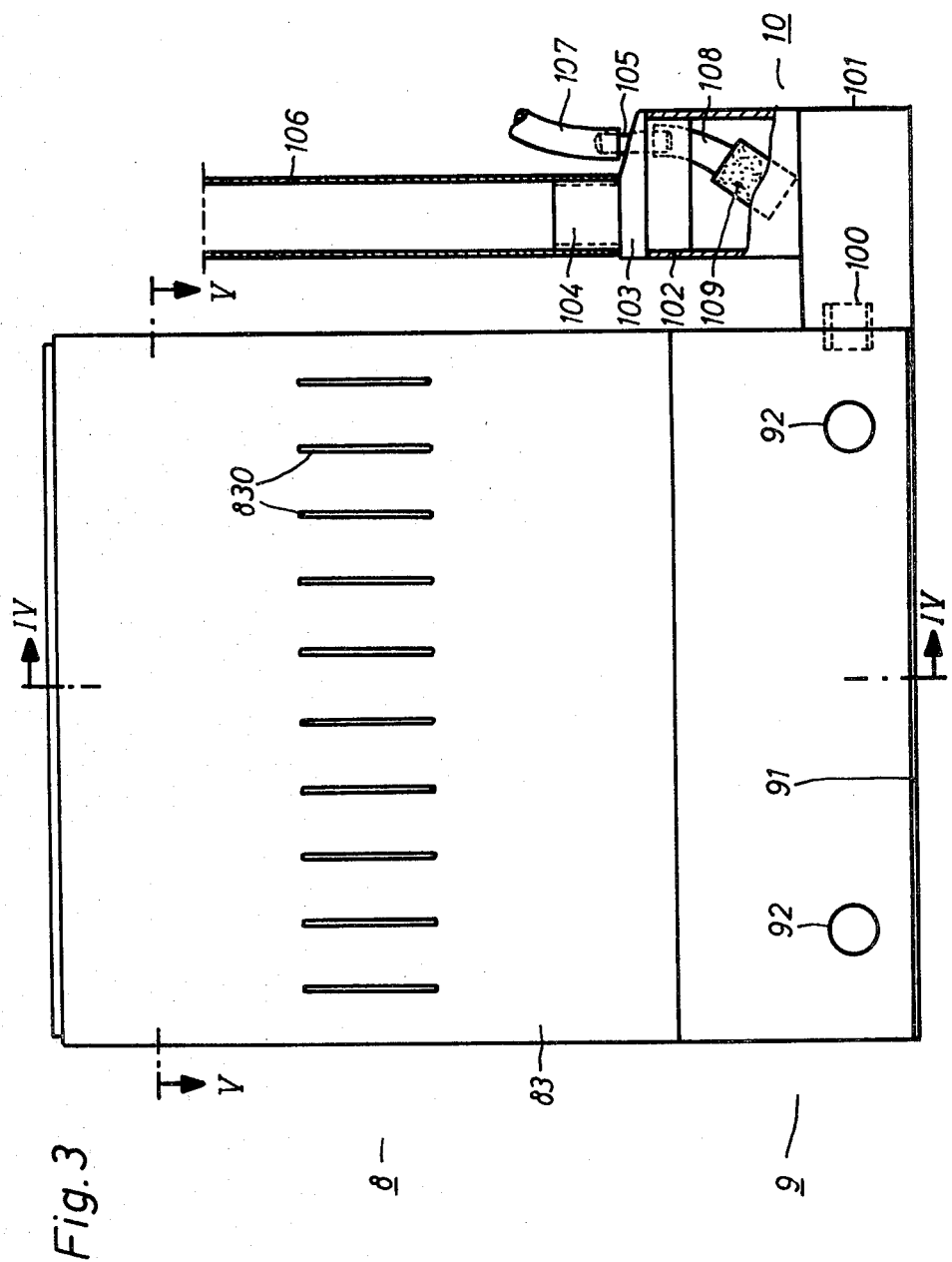

FIG. 1 the variation possibilities of the aquarium filter in accordance with the invention constructed in modular system, in simplified schematic presentation;

FIG. 2 the functional principle of the filter with reference to a cross section along line II—II through a cassette shown in FIG. 1, FIG. 3 a structural example of an aquarium filter in accordance with the invention, in front view, FIG. 4 a section according to line IV—IV of FIG. 3 and FIG. 5 a section according to line V—V of FIG. 3.

FIG. 1 shows an essentially rectangular block-like base portion 1 which is connected by a tubular connection element 2 with a further base portion 3. The base portion 3 is connected over a tubular connection element 4 with a supply portion 5, not further shown in the drawing, which in turn can be connected to an airlift or mammoth pump or to a centrifugal pump. Similarly constructed filter cassettes 6 are located respectively above each other over each of the base portions 1, 3. As can be easily seen, the illustrated arrangement with four filter cassettes 6 can be expanded in height as well as in width by further filter cassettes.

The operating principle of a cassette 6 is illustrated in FIG. 2 in a cross section according to the line II—II of FIG. 1. The filter cassette 6 has a separable front cover 61 and a separable back cover 62, in which the two covers 61, 62 are similarly constructed and have several slit-formed apertures 610, 620, respectively. Two cross walls or separation walls 63, 64, formed with apertures subdivide the interior space of the cassette 6 such that, between the front cover 61 and the intermediate wall 63, a front filter chamber 65, between the intermediate wall 63 and the intermediate wall 64 a clear-water chamber 66, and between the intermediate wall 64 and the back cover 62 a rear filter chamber 67 will be formed. The front filter chamber 65 is intended to receive a first filter material 68, for example a coarse-fiber plastic wool, whereas the rear filter chamber 68 is intended to receive a second filter material 69, for example quartz gravel. The clear-water chamber has a lower slit 70 through which connection is made to the base portions 1, 3, respectively, shown in FIG. 1, and the supply portion 5. A slit corresponding to the lower slit 7 provides for communication with the clear-water chamber of a filter cassette 6 seated thereabove and is closed off at the upwardly located filter cassette 6 by a suitable closure element. The aquarium water sucked over the clear-water chamber 66 is cleaned in a flow path indicated by the arrow 71 by mechanical cleaning in the front filter chamber 65 and subjected to a biological cleaning in a flow path indicated by the arrow 72 in the rear filter chamber 67.

FIGS. 3, 4 and 5 show in front view and in longitudinal section, transverse section, respectively, an aquarium filter with a filter cassette 8, a base portion 9, and a supply portion 10. The filter cassette 8 has two similarly constructed plug-on outer covers 81 with slit-shaped apertures 810, a fixedly located intermediate wall 82 which is formed with apertures 820 and which has drainage projections 821 shaped as ribs, as well as a plug-on outer add-on cover 83 which is formed with apertures 830. The cross section of the apertures 830 is selected to be smaller by several orders of magnitude than the cross section of the apertures 810 of one of the covers 81. The intermediate wall 82 together with the drainage projections 821 forms a clear-water chamber 84 which is bounded at both sides by filter chambers 85, 86, respectively. A contamination chamber 87 is positioned between the add-on cover 83 and the adjacent cover 81, into which contaminating particles suspended in the aquarium water can be sucked in a relatively wide catchment area. The filter chambers 85, 86 are destined to receive filter materials. As indicated in the cross section of FIG. 5, a coarse-fiber polyester wool 850 may serve as filter material within the filter chamber 85, acting as a mechanical filter, whereas a polyester fiber fleece 860 and quartz gravel 861 are located in the filter chamber 886 serving as a biological filter. The polyester wool 850 is held by the drainage projections 821 at such a space that it cannot stop up the clear-water chamber 84.

The filter cassette 8 which is seated on top of the base portion 9 has a slit 88 formed in its bottom in the region of the clear-water chamber 84, in which a projecting edge of a corresponding slit 90 formed in the base portion 9 fits.

In this manner, a connection is formed between the clear-water chamber 84 and the hollow space of the base part 9 on the one hand and, further, the position of the filter cassette 8 on the base portion 9 is fixed. A further slit 89 is formed on the opposite side of the filter cassette 8 in the region of the clear-water chamber 84 which in the same manner as the slit 90 has an upwardly projecting edge. Thus, a further filter cassette can be seated on the filter cassette 8 in proper position, simultaneously connecting the clear-water chambers with each other. If no further filter cassette is seated thereon, then the other slit 89 must be closed, for example by an adhesive tape or by a cover cap 890 shown in longitudinal section in FIG. 4 in chain-dotted line.

The base portion 9 can be so located at the bottom of an aquarium that it is covered up to about 90% of its height by the sand of the aquarium. To increase its steadiness, the base portion 9 has a base plate 91 projecting towards one side. Further increase of the steadiness is obtained if the base portion 9 is filled with a ballast material such as quartz gravel or the like. Several holes 92 are formed in the side walls of the base portion 9 in which the tubular connection element 100 of the supply part 10 can be introduced. The position of the supply portion 10 thus can be varied in accordance with the conditions in the aquarium with reference to the base portion 9. The openings 92 are further provided in order to permit possible expansion of the aquarium filter in combination with associated base portions. The openings 92 which are not used must be closed, for example by suitable closure flaps.

The supply portion 10 has an essentially rectangular block-like base body 101, the hollow space of which is connected by the connection element 100 with the base portion 9. The cylindrical pump housing 102 of an airlift pump is fixedly arranged on the base body 101. The upper cover 103 of the pump housing 102 has an upwardly extending stub and a stub 105 extending both upwardly and downwardly. A supply tube 106 of the airlift pump is seated on the stub 104, whereas the stub 105 is connected outwardly to an air supply hose 107 and inwardly to a hose connection 108 on which a porous air stone 109 is secured. The closing cover 103 is plugged on the pump housing 102 so that the air stone 109 can be easily exchanged.

Operation: The mammoth pump of the supply portion 10 sucks aquarium water over the base portion 9 and the clear-water chamber 84 so that, upon passage through the filter chambers 85, 86, it is cleaned mechanically and biologically, respectively. The cleaned aquarium water is then returned through the supply pipe 106 of the mammoth pump. The filter cassette which is illustrated in reduced scale in FIGS. 3 to 5 is, for example, 16 cm wide, 14 cm high, and 6 cm deep.

I claim:

1. Aquarium filter for combination with and connection to a suction device (107–109) having
   an essentially box-like filter cassette (6, 8) of elongated, essentially rectangular cross section adapted for vertically positioning in an aquarium, with a narrow dimension of the cassette facing the bottom of the aquarium,
   in which the cassette is formed to define two filter chambers (65, 67, 85, 86) spaced from each other, and a clear-water chamber (66, 84) positioned between the filter chamber and in fluid communication with the suction device, said clear-water chamber being separated from said filter chambers by an apertured vertical partitioning wall;
   and wherein, in accordance with the invention,
   the walls of the cassette separating said filter chambers from the aquarium comprise
   removable cover plates (61, 62, 81) extending parallel to the partitioning wall, and formed with openings (610, 620, 810) therein to permit aquarium water to pass therethrough and into the filter chambers, while permitting individual removal of filter material from the filter chambers;
   the cassette is formed with a lower opening (88) in communication with the clear-water chamber (66, 84);
   and the suction box (1, 3, 9) is essentially of rectangular or square cross section fitting against said narrow dimension of the cassette and positioned beneath the cassette, said suction box being formed with means (70, 90) communicating with the lower opening in the cassette and hence with the clear-water chamber (66, 84) at the side of the box in engagement with the cassette.

2. Aquarium filter according to claim 1, wherein the partitioning wall (82) is a single fixedly positioned wall in the cassette formed with openings therein and spacer means to define said clear-water chamber.

3. Aquarium filter according to claim 1, wherein the partitioning wall (82) is a vertically extending plate having several vertically extending drainage projections (821) between which the clear-water chamber is formed.

4. Aquarium filter according to claim 1, including an outer cover (83) formed with apertures (830) separably located and spaced from one of said cover plates (81);
   and wherein the cross section of the openings in the outer cover (83) is smaller by several orders of magnitude than the cross section of the openings (810) of the cover plates (81).

5. Aquarium filter according to claim 1, wherein the suction box (1, 3, 9) is formed with an upwardly positioned opening matching said lower opening in the cassette, fluid communication between the suction box (1, 3, 9) and the clear-water chamber (66, 84) being obtained by seating the cassette (6, 8) on the suction box with said matching opening in juxtaposition.

6. Aquarium filter according to claim 1, wherein the suction box has a laterally projecting stabilizing plate (91).

7. Aquarium filter according to claim 1, wherein the suction box comprises a removable cover to permit at least partially filling said box with ballast.

8. Aquarium filter according to claim 1, wherein, for multiple connection of a plurality of cassettes, the suction box (1, 3, 9) includes means for mutual connection of one or more further suction boxes.

9. Aquarium filter according to claim 1, wherein the cassette is formed with a closable opening at the top and opposite the lower opening, and of similar shape to permit vertically stacking and multiple connection of cassettes along their narrow dimension, and fluid communication of the clear-water chambers (66, 84) of the respectively stacked vertical cassettes.

10. Aquarium filter according to claim 1 or 2 or 3, wherein the cassette comprises injection-molded plastic.

* * * * *